United States Patent
Sourek, Jr.

(10) Patent No.: US 6,363,888 B1
(45) Date of Patent: Apr. 2, 2002

(54) ABSORBENT COMPACTED COMPOSITION

(76) Inventor: Robert A. Sourek, Jr., P.O. Box 482, Carson, WA (US) 98610

( * ) Notice: Subject to any disclaimer, the term of this patent is extended or adjusted under 35 U.S.C. 154(b) by 0 days.

(21) Appl. No.: 09/477,276

(22) Filed: Jan. 4, 2000

(51) Int. Cl.[7] .............................................. A01K 29/00
(52) U.S. Cl. ...................................... 119/172; 119/173
(58) Field of Search ................................ 119/171, 172, 119/173

(56) References Cited

U.S. PATENT DOCUMENTS

| | | | | |
|---|---|---|---|---|
| 4,203,388 A | * | 5/1980 | Cortigene et al. | 119/172 |
| 4,437,429 A | * | 3/1984 | Goldstein et al. | 119/173 |
| 4,506,628 A |   | 3/1985 | Stockel | 119/172 |
| 5,016,568 A | * | 5/1991 | Stanislowski et al. | 119/172 |
| 5,469,809 A | * | 11/1995 | Coleman | 119/173 |
| 5,542,374 A | * | 8/1996 | Palmer, Jr. | 119/173 |
| 5,775,259 A |   | 7/1998 | Tucker | 119/173 |
| 5,927,049 A |   | 7/1999 | Simard | 53/428 |
| 5,964,187 A | * | 10/1999 | Willis | 119/171 |
| 6,039,004 A | * | 3/2000 | Goss et al. | 119/172 |

* cited by examiner

Primary Examiner—Charles T. Jordan
Assistant Examiner—Elizabeth Shaw
(74) Attorney, Agent, or Firm—Marger Johnson & McCollom, P.C.

(57) ABSTRACT

An absorbent compacted composition is disclosed. The absorbent compacted composition of the present invention consists essentially of zeolite, a finely divided cellulosic material, such as fir, and finely divided pine. The amount of finely divided cellulosic material and finely divided pine is enough to bind the composition into a compacted form without additional binders or water addition. Also, the amount of pine is sufficient to reduce the friction heat during compaction to no greater than about 200° F.

20 Claims, 1 Drawing Sheet

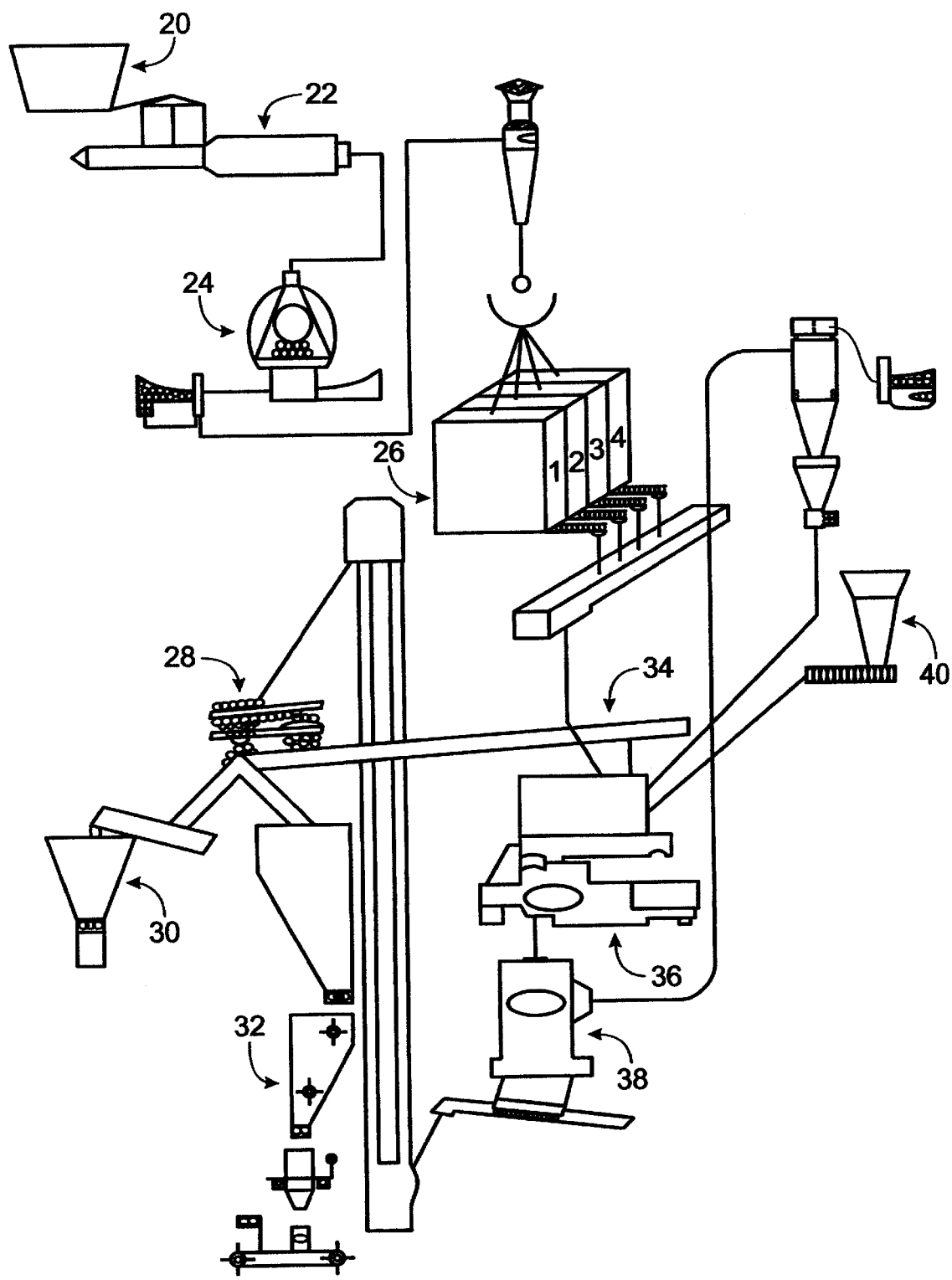

ABSORBENT COMPACTED COMPOSITION

BACKGROUND OF THE INVENTION

1. Field of the Invention

This invention relates generally to animal litter materials and, more particularly, to a natural absorbent compacted composition consisting essentially of zeolite, a finely divided cellulosic material and finely divided pine without an additional binder or water.

2. Description of the Related Art

Accumulation of animal waste materials inside animal stalls has been an age-old problem causing noxious odors and unsanitary environmental conditions that are harmful to the health of animals.

In general, when an animal urinates, the urine will subsequently form a fairly large moist area in the stall. Ammonia formed during the biological breakdown of the urine emanates highly objectionable odors and is capable of causing harmful health risks to an animal, especially a foal. Such ammonia is known to cause numerous equine health hazards, such as foal pneumonia. Because the foal stands closer to the floor and spends more time lying down in the stall where there are substantial concentrations of ammonia, the foal is at a greater risk of being exposed to the fumes.

In order to deal with such problems, various litter materials have been utilized for removing and absorbing the animal waste materials. For example, absorbent animal bedding has been used for absorbing and mixing with the animal waste materials. Once the animal waste materials are absorbed by or mixed with the absorbent bedding, the soiled bedding can be removed along with the animal waste materials.

Desirable animal litter materials should possess good absorption characteristics, resistance to dusting and an acceptable bulk density along with good odor reducing capability because of the problems such as described above.

Zeolite has been used in various ammonia odor-absorbing materials. The zeolite addition has been found to significantly reduce odors.

Such litter materials are conventionally formed using a binder or water addition. For example, U.S. Pat. No. 4,129,094 discloses a process forming animal litters using about 1 to about 10 weight percent of water and/or binder such as synthetic hydrophilic polymer or an inorganic material such as synthetic hydrophilic polymers including polyvinylalcohol, polyacrylic acid, polymethacrylic acid, polyacrylamide, hydroxyalkylmethacrylates and hydroxyalkylacrylates, polyethylene oxides, etc. Also, U.S. Pat. No. 5,452,684 discloses a process for extruding smectite clay (bentonite-containing clays) wherein the smectite clay is shear extruded with large amounts of water and/or an adhesive binder.

However, if an artificial or chemical substance is used instead of a natural material, it could be harmful to the health of the animals. Also, the additional process of adding a binder or water results in a relatively expensive and more complicated process. Further, the litter products formed using an additional wetting process tend to show low water uptake capability because of subsequent high moisture content of the absorbent composition caused from the wetting process.

Accordingly, a need remains for a natural absorbent compacted composition formed without an additional binder or water having good absorption characteristics, resistance to dusting and odor removing capability, thereby helping to improve animal health and eliminate unpleasant odors.

SUMMARY OF THE INVENTION

It is, therefore, an object of the invention is to provide a natural absorbent compacted composition consisting essentially of zeolite, a finely divided cellulosic material, and finely divided pine. The amount of finely divided cellulosic material and pine is sufficient to bind the composition into a compacted form without an additional binder or water while reducing the friction heat during compaction to no greater than about 200° F.

To achieve the above object, according to the present invention, there is provided a method of forming an all natural absorbent compacted composition of low moisture and without using an additional binder, which can be separated easily from solid waste droppings for disposal.

In one embodiment of the present invention, the finely divided cellulosic material is fir.

In another embodiment of the present invention, the pine is present in an amount of about 25% by weight of the total composition.

In addition, according to the present invention, there is provided a method for forming an absorbent compacted composition comprising the steps of: providing a finely divided cellulosic material, providing finely divided pine, mixing the finely divided cellulosic material and pine with zeolite, and compacting the mixture.

Further, the absorbent compacted composition of the present invention is preferably an all natural product. Thus, the use of chemical additives harmful to the animals can be avoided. Further, the composition of the present invention is neutral in pH and is a good nitrogen source. And the composition has a slow time release nitrogen addition to the soil.

The foregoing and other objects, features and advantages of the invention will become more readily apparent from the following detailed description of a preferred embodiment of the invention that proceeds with reference to the accompanying drawings.

BRIEF DESCRIPTION OF THE DRAWING

The drawing is a diagrammatic illustration, which shows a method for preparation of absorbent compacted composition according to a preferred embodiment of the present invention.

DETAILED DESCRIPTION

The present invention provides a natural absorbent compacted composition including zeolite, a finely divided cellulosic material, and finely divided pine. The finely divided cellulosic material is preferably fir. The finely divided cellulosic material and the finely divided pine are present in an amount sufficient to bind the composition into a compacted form without additional binders or water addition while reducing the friction heat during compaction to no greater than about 200° F.

In one embodiment of the present invention, an absorbent compacted composition consists essentially of zeolite and a binder. The binder consists essentially of finely divided pine and the finely divided cellulosic material in an amount effective to bind the composition into a compacted form.

According to the preferred embodiment of the present invention, the finely divided cellulosic material is present in an amount of about 70% by weight of the total composition. The zeolite is present in an amount of between about 1% to about 10% by weight of the total composition. More preferably, zeolite is present in an amount of about 5% by weight of the total composition. Further, the pine is present in an amount of about 25% by weight of the total composition.

Usually, the use of pine has not been favored for animal litters because pine has a lot of resins that have a noxious aroma and is known to have a negative effect on animals. Specifically, pine is known to emit turpentine that is recognized as especially being harmful to young animals. For this reason, the weight percentage of pine of the present invention has been chosen in a manner that the amount of pine is enough for binding the absorbent composition without additional binders and water but not enough to cause such a harmful-to-animal aroma problem. Further, the amount of pine in the composition is sufficient to reduce the friction heat of the pellet as it goes through the dye to keep the composition from overheating and control the temperature of the pellet within 200° F.

With these particular percentages of the composition, especially with the weight percentage of pine, the absorbent compacted composition of the present invention can be produced without an additional binder or wetting process. As a result, the absorbent compacted composition of the present invention can attain good absorption characteristics, resistance to dusting and odor removing capability. The absorbent compacted composition does not require any additional chemical binders that could be harmful to animals, especially a foal. Also, the present invention is more advantageous because it does not require any additional wetting process, thereby increasing water uptake capability of the absorbent composition. Thus, the present invention absorbent compacted composition can help improve animal health and eliminate unpleasant odors significantly.

In addition, since the present invention utilizes commonly available inexpensive material such as wood shavings, sawdust and so on from sawmills without using expensive additives, it can be more economical.

Now referring to the diagrams shown in the drawings, there are shown an infeed 20, a dryer system 22, a hammer mill 24, an inprocess storage 26, a fine shaker 28, a mixing bin 34, a zeolite metering 40, a pellet machine 36 and a cooler 38.

In operation, finely divided pine or cellulosic material such as fir is delivered and placed into infeed 20. Clean wood shavings or sawdust direct from bins at sawmills can be used for finely divided cellulosic material or pine. The finely divided cellulosic material or pine is preferably processed through the dryer system 22 to attain about 9% moisture content, respectively.

After the finely divided cellulosic material or pine has been dried, it may be fed into a 3/16 inch multiple-level screen (not shown) to remove large particles.

In a preferred embodiment, the screened finely divided cellulosic material or pine may be transferred to a hammer mill 24 and grounded down to minus 3/16 inch size.

The finely divided cellulosic material or pine is then selectively transferred to one of the inprocess storages 26. Here, there are screw augers (not shown) on the bottom of the storage 26, thereby controlling the proportions of the finely divided cellulosic material and pine.

Subsequently, they are mixed in mixing bin 34 with zeolite from zeolite metering 40. In the present invention, the mixing step is performed without adding additional binders or wetting process.

Subsequently, the mixture is compacted. The compacting step may be performed by compressing the mixture in a pellet shape. Here, the amount of pine is sufficient to reduce the friction heat during the pelletizing step to no greater than about 200° F. These pellets can be produced using a conventional pelletizing machine 36 such as a rotary pellet mill of standard design.

The pellets are cooled to be compatible with the packaging materials using cooler 38. The cooled pellets are then transferred to fines shaker 28 before the pellets are packaged. In this process, some left-over powders on the pellets can be shaken off and can be recycled back to the mixing bin 34.

As a result, natural and low moisture pellets can be produced for better animal health, drier stalls, cleaner floors with a fresh aroma. When urine hits the pellets, the compressed pellets soak up and revert to a sawdust or cellulosic material. The pellets also neutralize urine. In addition, the pellet allows easy cleaning of solid wastes.

The present invention is an improvement over the prior art in that the prior uses of zeolite often times involved merely sprinkling zeolite in the stall along with a bedding material already in the stall. With this conventional method, the zeolite, being a fine powder, can quickly sift down through the bedding material and away from the surface of the bedding material where it is most effective in neutralizing urine odors. By forming a mixture of zeolite and finely divided pine and a cellulosic material such as fir, then compacting the mixture into pellets, the zeolite is prevented from sifting down through the bedding material and remains at the surface where it is most effective. In addition, a time release effect can be achieved.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A natural absorbent compacted composition consisting essentially of:
   zeolite;
   a finely divided cellulosic material; and
   finely divided pine,
   wherein an amount of the finely divided cellulosic material and pine is sufficient to bind the composition into a compacted form without an additional binder or water while reducing the friction heat during compaction to no greater than about 200° F.

2. The composition of claim 1, wherein said finely divided cellulosic material is fir.

3. The composition of claim 1, wherein said finely divided cellulosic material is present in an amount of about 70% by weight of the total composition.

4. The composition of claim 1, wherein said zeolite is present in an amount of between about 1% to about 10% by weight of the total composition.

5. The composition of claim 1, wherein said zeolite is present in an amount of between about 5% by weight of the total composition.

6. The composition of claim 1, wherein said pine is present in an amount of about 25% by weight of the total composition.

7. A natural absorbent compacted composition consisting essentially of:
   zeolite; and
   a binder consisting essentially of finely divided pine and cellulosic material in an amount effective to bind the composition into a compacted form while reducing the friction heat during compaction to no greater than about 200° F.

8. A method for forming an all natural absorbent compacted composition comprising the steps of:
providing a finely divided cellulosic material;
providing finely divided pine;
mixing the finely divided cellulosic material and pine with zeolite; and
compacting the mixture.

9. The method of claim 8, further comprising, before said mixing step, hammer milling the finely divided cellulosic material and pine.

10. The method of claim 9, further comprising, before said hammer mixing step, feeding said finely divided cellulosic material and pine into a 3/16 inch multiple-level sieve to remove large particles.

11. The method of claim 8, wherein said pine and said cellulosic material are present in an amount sufficient to bind the composition in a compacted form without additional binders or water.

12. The method of claim 8, wherein said compacting step is performed by compressing the mixture in a pellet, wherein the amount of pine is sufficient to reduce the friction heat during the compacting step to no greater than about 200° F.

13. The method of claim 8, further comprising, before said mixing step, drying said finely divided cellulosic material and pine to about 9% moisture content.

14. The method of claim 8, wherein said hammer milling step is performed to minus 3/16 inch size.

15. An all natural absorbent compacted composition consisting essentially of a cellulosic material, pine and zeolite, wherein said pine and said cellulosic material are present in an amount sufficient to bind the composition in a compacted form without additional binders or water, said absorbent compacted composition is formed by the process comprising the steps of:
providing a finely divided cellulosic material;
providing finely divided pine;
mixing the finely divided cellulosic material and pine with zeolite; and
pelletizing the mixture,
wherein the amount of pine is sufficient to reduce the friction heat during the pelletizing step to no greater than about 200° F.

16. The absorbent compacted composition of claim 15, wherein the process further comprising, before said mixing step, hammer milling said finely divided cellulosic material and pine.

17. The absorbent compacted composition of claim 16, wherein the process further comprising, before said hammer mixing step, feeding said finely divided cellulosic material and pine into a 3/16 inch multiple-level sieve to remove large particles.

18. The absorbent compacted composition of claim 15, wherein the process further comprising, before said mixing step, drying said finely divided cellulosic material and pine to about 9% moisture content.

19. The method of claim 15, wherein said hammer milling step is performed to minus 3/16 inch size.

20. A method of forming a pellet, comprising:
providing a pellet mill;
providing a composition consisting essentially of zeolite; a finely divided cellulosic material; and
finely divided pine,
wherein an amount of the finely divided cellulosic material and pine is sufficient to bind the composition into a compacted form without an additional binder or water;
compacting the composition by having the composition passing through the pellet mill, thereby forming a pellet while maintaining a temperature of the pellet to no greater than about 200° F.

* * * * *